C. A. RIVERS.
NUT LOCK.
APPLICATION FILED JUNE 25, 1919.

1,332,521.

Patented Mar. 2, 1920.

Inventor
Charles A. Rivers
By Franklin N. Hough
Attorneys

UNITED STATES PATENT OFFICE.

CHARLES ALFRED RIVERS, OF ENTERPRISE, OREGON.

NUT-LOCK.

1,332,521.     Specification of Letters Patent.     Patented Mar. 2, 1920.

Application filed June 25, 1919. Serial No. 306,674.

*To all whom it may concern:*

Be it known that I, CHARLES ALFRED RIVERS, a citizen of the United States, residing at Enterprise, in the county of Wallowa and State of Oregon, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in nut locks, and consists essentially in the provision of an angled bar adapted to engage a plurality of nuts upon bolts for holding, fish plates, or other devices, means being provided for holding the bar from lengthwise or lateral movements.

The invention comprises various details of construction, combination and arrangement of parts which will be hereinafter fully described, shown in the accompanying drawings and then specifically defined in the appended claim.

My invention is illustrated in the accompanying drawings which, with the letters of reference marked thereon, form a part of this application, and in which.

Figure 1:
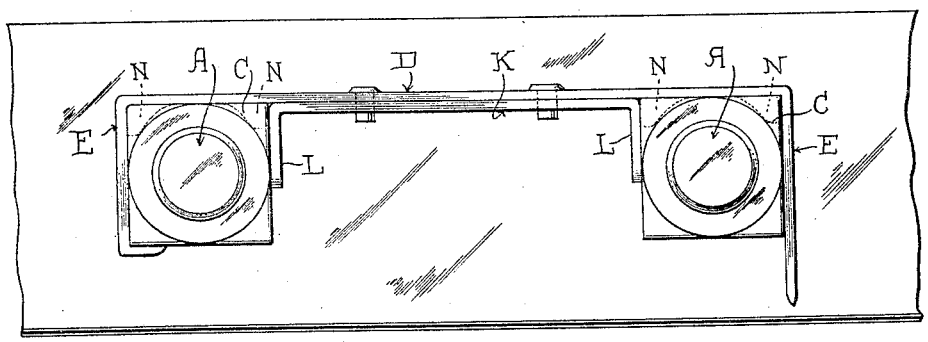
Figure 1 is a side elevation showing the application of my invention applied to a fish plate.
Figure 2:
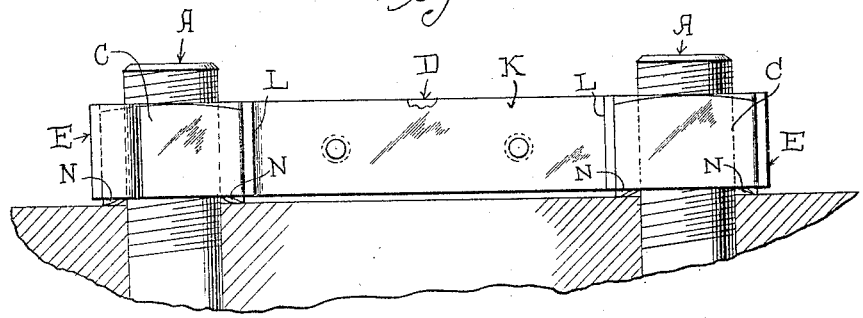
Fig. 2 is a side elevation of a nut lock shown in place.
Figure 3:
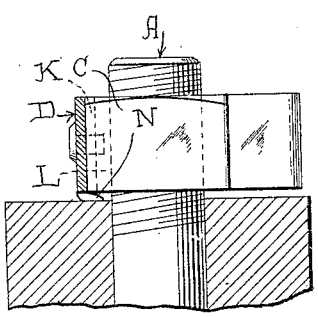
Fig. 3 is a detail sectional view.

Reference now being had to the details of the drawings by letter:

A designates bolts passing through a fish plate, and C are nuts upon the bolts. A bar D is bent at right angles at E, and the shank portion of the bar is adapted to rest upon the top edges of the nut while the angled portions engage over the angled corners of the nut. The ends of each bar are bent in a plane parallel to the bar which rests upon the nuts and underneath the latter. A second bar K is bolted or otherwise secured to the bar D intermediate its angled portions, and each end of the bar K is bent at right angles as at L, designed to engage the inner edges of the adjacent nuts, as shown in the drawings.

Said bar D has lugs N projecting from its inner longitudinal edge, the adjacent edges of said lugs being concaved adapted to conform to the convexed portion of the bolt. Said lugs will prevent the bars from moving away from the fish plate as they will be held by the lugs coming in contact with the inner faces of the bolts, while the angled portions of the two bars engaging the opposite edges of the nuts will prevent the latter from turning upon the bolts, thus producing a secure nut lock.

It will be understood that the two bars are fastened together after the bar D has been adjusted in place, by simply passing rivets through registering apertures in the shank portions of the bars and upsetting the same.

What I claim to be new is:

A nut lock comprising two bars fastened together, one of which is provided with parts which are bent at right angles and parallel and engaging the outer edges of square outlined nuts, the ends of such bars adapted to be bent about the outer corners of the nuts and in alinement, the other bar having right angled ends between the angled parts of the first-mentioned bar, for engagement with the adjacent edges of the nuts partially the width thereof.

In testimony whereof I hereunto affix my signature.

CHARLES ALFRED RIVERS.